US005084347A

United States Patent [19]

Kuhnhäuser-Buch et al.

[11] Patent Number: 5,084,347

[45] Date of Patent: Jan. 28, 1992

[54] WATER-RESISTANT PHOTOGRAPHIC PAPER SUPPORT

[75] Inventors: Sigrid Kuhnhäuser-Buch, Osnabrück; Robert Winiker, Hasbergen, both of Fed. Rep. of Germany

[73] Assignee: Felix Schoeller GmbH & Co. KG, Osnabrück, Fed. Rep. of Germany

[21] Appl. No.: 384,177

[22] Filed: Jul. 21, 1989

[30] Foreign Application Priority Data

Jul. 28, 1988 [EP] European Pat. Off. ........ 88112205.5

[51] Int. Cl.[5] ........................ B32B 27/32; B32B 29/00; G03C 1/76

[52] U.S. Cl. .................................... 428/342; 428/511; 428/513; 428/516; 430/530

[58] Field of Search ................ 428/342, 511, 513, 516

[56] References Cited

U.S. PATENT DOCUMENTS 4,731,291 3/1988 Kerkhoff et al. .................. 428/342

FOREIGN PATENT DOCUMENTS 2515823 10/1976 Fed. Rep. of Germany .
3241599A1 5/1983 Fed. Rep. of Germany .
3543597A1 6/1987 Fed. Rep. of Germany .
2109704B 6/1983 United Kingdom .

*Primary Examiner*—P. C. Sluby
*Attorney, Agent, or Firm*—Horst M. Kasper

[57] ABSTRACT

A water-resistant photographic paper support comprises a base paper, coated on both sides with polyolefin, internally sized by the application of a hydrophobizing sizing agent, and surface-treated with an aqueous coating mass, which contains an anionic polyacrylamide and an oxidized starch as well as a soluble salt of an alkali metal or an alkali earth metal.

11 Claims, No Drawings

WATER-RESISTANT PHOTOGRAPHIC PAPER SUPPORT

BACKGROUND OF THE INVENTION

1. Field of the Invention

This invention relates to a resin-coated paper support material for photographic coatings.

2. Brief Description of the Background of the Invention Including Prior Art

As a result of the high demands of modern developing techniques and processes, resin-coated photographic paper supports have been developed which are highly resistant to penetration by developing and fixing fluids and which must possess certain other mechanical properties such as a certain stiffness, internal bond strength, breaking strength, etc.

The use of paper, coated on both sides with water-resistant resin, as a support material for photographic coatings, is not new. Such a material normally consists of a paper core to which a polyolefin coating has been affixed on both surfaces. The front side coating, onto which a light-sensitive emulsion coating is to be affixed at a later stage, usually contains a white pigment at least, in order to increase the definition of the photographic image. Other additives, such as dispersing agents, anti-oxidation agents, and antistatic agents, as well as color pigments, may be found.

Although this effectively protects both surfaces of a base paper against the penetration of a developing solution, it leaves the edges of such exposed. As a result, air and light, discoloring the developer, penetrates these edges and the paper's value as a photographic base material suffers.

In order to minimize this edge penetration of the photographic base paper, it is "hard-sized". Apart from the internal water-repellent sizing of the paper core, further tests have been carried out to size the surfaces of the base paper by coating them with differing high-molecular substances, among which are to be found gelatine, oxidized starches, and other starch derivatives, carboxy-methyl cellulose, modified polyvinyl alcohols, and other binding agents. This surface sizing of the base paper is done with aqueous coating solutions which, as in the case of the above-mentioned binding agents, can also contain further additives, such as optical brightness, pigments, defoaming agents, cross-linking additives, etc. The solutions are applied to the surface of the paper either by a sizing press or by other spreading processes such as blade-coating method, rod-coating method, or roll-coating method.

Starch has been applied for a long time to improve, above all, the surface characteristics and as additional protection of the surfaces of the beater-sized base paper against outside influences. The coating usually contains modified, degraded starches, such as cationic, anionic, or oxidized starches.

The application of starches in surface treatment (German Patent No. DE 25 15 823), while ensuring good adhesion between the base paper and the polyolefin coating, leaves something to be desired regarding edge penetration. Moreover, it is unsatisfactory regarding other physical values, especially internal bond strength.

The German Patent No. DE-OS 32 41 599 suggests sizing the paper core by applying a coat of dicarboxylic acid modified polyvinyl alcohol. This method, however, does not ensure good uniform adhesion between the polyolefin coating and the paper core, and the so-called edge penetration is equally unsatisfactory. This method, moreover, is not without its problems because of the low electrolytic tolerance levels of the polyvinyl alcohol.

The attempt to use a monocarboxylic acid modified polyvinyl alcohol, as taught in German Patent No. DE-OS 3,543,597, while offering good results as far as edge penetration, inner rigidity, and polyolefin adhesion are concerned, presents problems during the manufacture of the solution. In the presence of salts, the polyvinyl alcohol, as a result of its low electrolyte compatibility tolerance, tends to flocculate.

The precipitate, formed by the application of salts to improve conductivity, is extremely difficult to redissolve during the mixing process of the solution. The result is a reduction of the surface quality of the photographic base paper when such a coating is applied, caused by the above-mentioned precipitate creating unevenesses on the surfaces. On the other hand, the precipitate removal by filtering causes a reduction of the amount of binding agent and, therefore, reduces the values of the internal bond strength of the base paper.

SUMMARY OF THE INVENTION

1. Purposes of the Invention

The objective of the present invention is therefore, to develop a water-resistant, photographic paper support which, in addition to exhibiting high internal bond strength, is resistant to the penetration of photographic developing solutions and ensures good adhesion qualities to polyethylene as well as having even surfaces created by non-flocculating coating solutions containing electrolytes.

These and other objects and advantages of the present invention will become evident from the description which follows.

2. Brief Description of the Invention

The present invention provides for a water-resistant photographic paper support. A sheet material base paper, having two sides and coated on both sides with polyolefin, is internally sized using one or more hydrophobizing sizing agents. A surface-coating including a polyacrylamide, a modified starch, and a water-soluble inorganic salt. The water-soluble inorganic salt is a member selected from the group consisting of chlorides of an alkali metal, sulphates of an alkali metal, chlorides of an alkali earth metal, sulphates of an alkali earth metal and mixtures thereof.

The polyacrylamide can be a member selected from the group consisting of an anionic polyacrylamide, a cationic polyacrylamide, an amphoteric polyacrylamide and a mixture thereof.

The polyacrylamide can be an anionic polyacrylamide and has an anionic group content of between 0 and 85 mole-%.

The modified starch can be an oxidized starch.

The polyacrylamide and the modified starch can be in a weight ratio to each other of between 1 to 3 and 3 to 1.

The coating mass can be attached to the base paper in such a quantity so as to form a dry weight of between 1.5 and 6 $g/m^2$.

The soluble inorganic salt can be a member selected from the group consisting of calcium chloride, magnesium chloride, sodium chloride, potassium chloride, sodium sulphate, potassium sulphate, and mixtures thereof.

The salt can be sodium chloride.

The weight ratio of salt to polyacrylamide can be between 2 to 3 and 2 to 1.

The novel features which are considered as characteristic for the invention are set forth in the appended claims. The invention itself, however, both as to the composition of the layer and the coating composition, together with additional objects and advantages thereof, will be best understood from the following description of specific embodiments when read in connection with the specific examples set forth in the accompanying tables.

DESCRIPTION OF INVENTION AND PREFERRED EMBODIMENT

In accordance with the present invention, there is provided an aqueous solution of polyacrylamide, modified starch, and soluble, inorganic salt of the group of chlorides and sulphates of an alkali metal or alkaline earth metal as a coating solution for surface sizing of a base paper.

The photographic base paper support according to the invention consists of a base paper coated on both sides with polyolefin. The base paper is manufactured in a conventional way on a paper machine. The pulp is beater-sized by using normal sizing agents. Suitable sizing agents are alkylketene dimers, fatty acids or salts thereof, or combinations of these. Apart from this, the paper stock may contain filling materials, pigments, optical brighteners, wet strengthening agents, antioxidants, and any other additives conventionally used in the manufacture of a photographic base paper.

Surprisingly, it has been found that the advantages, such as a reduction in the edge penetration of the liquid developers, an increase in the internal bond strength of the base paper, and improved polyethylene adhesion only occur when the coating mass contains a mixture of polyacrylamide and oxidized starch. The weight ratio of polyacrylamide to oxidized starch is between 1 to 3 and 3 to 1.

The polyacrylamide used here may be either an anionic, a cationic, or an amphoteric polyacrylamide or a mixture of any of these.

The anionic polyacrylamide may be, for example, a partly hydrolyzed product of polyacrylamide, an acrylamide/acrylic acid-copolymer, an acrylamide/methacrylic acid-copolymer, an acrylamide/maleinic anhydride-copolymer, or an acrylamide/acrylic acid ether-copolymer.

According to the invention, an anionic polyacrylamide with an anionic content of between 0 and 85 mole-% is preferable.

The cationic polyacrylamide may be a product of degraded polyacrylamide, the product of a reaction between polyacrylamide, and polyethylenimine, or a copolymer of acrylamide with a cationic monomer.

The amphoteric polyacrylamide is a polyacrylamide which contains in the macromolecule both anionic and cationic groups. The aforementioned anionic groups are of the carboxylate group, especially alkali-carboxylate group. The cationic groups may be of any form, such as of quarternated or protonated alkyl amino alkylene acrylate groups or alkyl amino alkylene acrylamide groups.

The modified starch used according to the invention may be an esterified, etherified, acidic hydrolytic or enzymatic degraded starch, or oxidized starch. The esterified starch may be, for example, a starch phosphate ester, a starch acetate, a starch citrate, or starch formate. The following may be considered as etherified starch: alkyl starch ether, hydroxyl alkyl starch ether, carboxyl alkyl starch ether, or allyl starch ether. The acidic hydrolytic degraded starch can be a degraded starch in the presence of acids, such as hydrochloric acid, sulphuric acid, or phosphoric acid. The oxidized starch is a starch degraded by alkaline oxidation in which the oxidizer may be hypochlorite or periodate. According to the invention, it is preferable to use an oxidized starch here.

Apart from the above-mentioned, in order to achieve the effect required by the invention, soluble inorganic salts from the group of the chlorides or sulphates of an alkali metal or alkaline earth metal must be added to the aqueous surface coating solution, any of the following will suffice: calcium chloride, magnesium chloride, sodium chloride, potassium chloride, magnesium sulphate, sodium sulphate, potassium sulphate, or any mixture of these. The invention prefers sodium chloride. In the examples used to describe the invention, calcium chloride and sodium chloride were used to represent all the above-mentioned salts, although other salts also confirm the achieving of the required effect. The weight ratio of salt to polyacrylamide may be between 2 to 3 and 2 to 1.

The mixture, according to the invention, is coated onto the paper using conventional processing in a quantity applied to result in between 1.5 and 6 $g/m^2$ in dry state.

The following examples describe and detail the invention.

Example 1

An aqueous fiber suspension (100% hardwood kraft pulp, consistency: 4 weight-%, beating degree: 35° SR) was internally sized with:

| | |
|---|---|
| 2 weight-percent | anionic modified starch |
| 0.75 weight-percent | anionic polyacrylamide |
| 0.75 weight-percent | cationic polyacrylamide |
| 0.6 weight-percent | alkylketene dimer (Aquapel C101 from Hercules CmbH & Co.) |
| 0.10 weight-percent | epoxydized fatty acid amide (Baysynthol CA 36 029 from Bayer AG) |
| 1.3 weight-percent | polyamide-polyamide-epichlorohydrine resin (Kymene 557 HP from Hercules GmbH & Co.) |

A 170 $g/m^2$ base paper was manufactured as above and was surface sized with an aqueous solution according to Table 1. The coating quantity applied was approximately 2.5 $g/m^2$, $\pm 0.2$ $g/m^2$ after drying.

TABLE 1

Coating Variations according to Example 1

| Contents of the Coating | Example (weight-percent) 1a | 1b | 1c | 1d | 1e | 1f | 1g | 1h | 1i | 1j | 1k | 1l |
|---|---|---|---|---|---|---|---|---|---|---|---|---|
| Brightener | 0.4 | 0.4 | 0.4 | 0.4 | 0.4 | 0.4 | 0.4 | 0.4 | 0.4 | 0.4 | 0.4 | 0.4 |
| Anionic PAA* with: | | | | | | | | | | | | |
| 0% Anionic Group | 1 | — | — | — | 2 | — | — | — | 3 | — | — | — |
| 25% Content | — | 1 | — | — | — | 2 | — | — | — | 3 | — | — |
| 50% Content | — | — | 1 | — | — | — | 2 | — | — | — | 3 | — |
| 85% Content | — | — | — | 1 | — | — | — | 2 | — | — | — | 3 |
| Oxid. Starch | 3 | 3 | 3 | 3 | 2 | 2 | 2 | 2 | 1 | 1 | 1 | 1 |

TABLE 1-continued

| Coating Variations according to Example 1 | | | | | | | | | | | | |
|---|---|---|---|---|---|---|---|---|---|---|---|---|
| Contents of the Coating | Example (weight-percent) | | | | | | | | | | | |
| | 1a | 1b | 1c | 1d | 1e | 1f | 1g | 1h | 1i | 1j | 1k | 1l |
| $CaCl_2 \times 2H_2O$ | 40 g/l 1 solution | | | | | | | | | | | |

*PAA = Polyacrylamide

For the tests, the coated paper was dried and polyethylene-coated using a pilot extrusion coating plant (HDPE, density: 0.950 g/m$^3$, temperature: 295°, initial pressure: 3.2 bar).

Example 2

A 170 g/m$^2$ base paper was manufactured as in Example 1 and surface-sized with an aqueous coating mass according to Table 2 (see below). The coating quantity applied was approximately 3 g/m$^2$±0.25 g. The treated paper was dried and polyethylene-extrusion-coated as in Example 1.

TABLE 2

| Coating Variations according to Example 2 | | | | | | | | | | | | | |
|---|---|---|---|---|---|---|---|---|---|---|---|---|---|
| Contents of the Coating | Example (weight-percent) | | | | | | | | | | | | |
| | 2a | 2b | 2c | 2d | 2e | 2f | 2g | 2h | 2i | 2j | 2k | 2l | 2m |
| Brightener | 0.4 | 0.4 | 0.4 | 0.4 | 0.4 | 0.4 | 0.4 | 0.4 | 0.4 | 0.4 | 0.4 | 0.4 | 0.4 |
| Anionic PAA with: | | | | | | | | | | | | | |
| 0% | 1 | — | — | — | 2 | — | — | — | 3 | — | — | — | 1 |
| Anionic Group 25% Content | — | 1 | — | — | — | 2 | — | — | — | 3 | — | — | — |
| 50% Content | — | — | 1 | — | — | — | 2 | — | — | — | 3 | — | — |
| 85% Content | — | — | — | 1 | — | — | — | 2 | — | — | — | 3 | — |
| Oxid. Starch | 3 | 3 | 3 | 3 | 2 | 2 | 2 | 2 | 1 | 1 | 1 | 1 | 3 |
| NaCl | 20 g/l 1 solution | | | | | | | | | | | | |
| KCl | 15 g/l 1 solution | | | | | | | | | | | | |

COMPARATIVE EXAMPLE C1

A base paper was manufactured as in Example 1 and was surface-sized with an aqueous coating mass according to Table 3. The coating quantity applied was 3 g/m$^2$±0.2 g, in dry weight. The dried paper was polyethylene-extrusion-coated as in Example 1.

TABLE 3

| Coating Variations according to Comparative Example C1 | | | | | | | | | | |
|---|---|---|---|---|---|---|---|---|---|---|
| Contents of the Coating | Example (weight-percent) | | | | | | | | | |
| | C1a | C1b | C1c | C1d | C1e | C1f | C1g | C1h | C1i | C1j |
| Optical Brightener | 0.4 | 0.4 | 0.4 | 0.4 | 0.4 | 0.4 | 0.4 | 0.4 | 0.4 | 0.4 |
| Oxid. Starch | 3 | 4 | 5 | 6 | 7 | 3 | 4 | 5 | 6 | 7 |
| $CaCl_2 \times 2H_2O$ | 40 g/l 1 solution | | | | | | | | | |
| NaCl | | | | | | 20 g/l 1 solution | | | | |

TABLE 4

| Coating Variations according to Comparative Example C2 | | | | | | | | | | | | | | | | | | |
|---|---|---|---|---|---|---|---|---|---|---|---|---|---|---|---|---|---|---|
| Contents of the Coating | Example (weight-percent) | | | | | | | | | | | | | | | | | |
| | C2a | C2b | C2c | C2d | C2e | C2f | C2g | C2h | C2i | C2j | C2k | C2l | C2m | C2n | C2o | C2p | C2q | C2r |
| Optical Brightener | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| PVA* with: | | | | | | | | | | | | | | | | | | |
| 0% $COO^-$ | 3 | 4 | 5 | — | — | — | — | — | — | 3 | 4 | 5 | — | — | — | — | — | — |
| 1.5% $COO^-$ | — | — | — | 3 | 4 | 5 | — | — | — | — | — | — | 3 | 4 | 5 | — | — | — |
| 3.0% $COO^-$ | — | — | — | — | — | — | 3 | 4 | 5 | — | — | — | — | — | — | 3 | 4 | 5 |
| $CaCl_2 \times 2H_2O$ | 40 g/l 1 solution | | | | | | | | | | | | | | | | | |
| NaCl | | | | | | | | | | 20 g/l 1 solution | | | | | | | | |

*PVA = Polyvinyl alcohol

COMPARATIVE EXAMPLE C3

A base paper as per Example 1 was surface-sized with an aqueous coating mass. The contents of the mass can be seen in Table 6. The coating quantity applied was 2.5 g/m$^2$, ±0.2 g, in dry state. The dry paper was polyethylene-extrusion-coated as in Example 1.

TABLE 5

| Coating Variations according to Comparative Example C3 | | | | | | | | | | | | |
|---|---|---|---|---|---|---|---|---|---|---|---|---|
| Contents of the Coating | Example (weight-percent) | | | | | | | | | | | |
| | C3a | C3b | C3c | C3d | C3e | C3f | C3g | C3h | C3i | C3j | C3k | C3l |
| Optical Brightener | 0.4 | 0.4 | 0.4 | 0.4 | 0.4 | 0.4 | 0.4 | 0.4 | 0.4 | 0.4 | 0.4 | 0.4 |
| Anionic PAA with: | | | | | | | | | | | | |
| 0% Anionic Group Content | 1 | — | — | — | 2 | — | — | — | 3 | — | — | — |
| 25% Content | — | 1 | — | — | — | 2 | — | — | — | 3 | — | — |

TABLE 5-continued

| Contents of the Coating | Coating Variations according to Comparative Example C3 — Example (weight-percent) | | | | | | | | | | | |
|---|---|---|---|---|---|---|---|---|---|---|---|---|
| | C3a | C3b | C3c | C3d | C3e | C3f | C3g | C3h | C3i | C3j | C3k | C3l |
| 50% Content | — | — | 1 | — | — | — | 2 | — | — | — | 3 | — |
| 85% Content | — | — | — | 1 | — | — | — | 2 | — | — | — | 3 |
| Oxid. Starch | 3 | 3 | 3 | 3 | 2 | 2 | 2 | 2 | 1 | 1 | 1 | 1 |

TESTING OF THE PAPER SAMPLES MANUFACTURED ACCORDING TO EXAMPLES 1 AND 2 AND COMPARATIVE EXAMPLES C1, C2 AND C3

A part of the paper samples tested without polyolefin coatings, the other part was coated as already described and then subjected to testing. The following test methods were used to examine the paper samples:

1. Internal Bond Strength

The tests were carried out according to the regulations of TAPPI RC 308 on an Internal Bond Impact Tester Model B. The results are given in ft.lbs$\times 10^{-3}$.

2.Edge Penetration

The polyethylene coated paper sample strips were treated in a development bath of commercial liquid developer at a temperature of 30° C. for a period of 25 minutes. The penetration of developer was measured at both edges. The results are given as edge penetration (EP) and are in millimeters.

3. Adhesion between the Polyethylene Coating and Precoated Base Paper

The tests were carried out using a tensile strength tester (model 556) from the company Lorentzen & Wettre. The paper samples, having a size of 15$\times$180 mm, were tested with the machine operating at a speed of 70 mm/min, and a drawing angle of 180°. The results are given in mN/15 mm.

4. Flocculation through Electrolyte Addition

A portion of the solution produced the coater, size the base paper was poured and spread out on glass plates, dried, and then visually surveyed for traces of flocculation of precipitate.

Further tests were carried out for stiffness, breaking strength, and water absorption (Cobb test). The results are all within general levels and did not influence the valuation of the invention.

A summary of the results of the tests described can be found in the Tables 6–8. The results of the tests carried out on the paper samples, treated according to the invention, can be found in Table 6. Tables 7 and 8 contain the results of the Comparative Examples.

As can be seen from the tables, the best results were achieved with a solution of polyacrylamide, oxidized starch, and calcium chloride or sodium chloride (see Table 6).

On the one hand, the application of a coating mass, as described in these pages, improves the mechanical properties of the base paper while simultaneously allowing the problem-free employment of the necessary antistatics (salts).

TABLE 6

Test Results of Sample Paper Processed according the Invention (Examples 1 and 2)

| Example | Internal Bond Strength (ft · lb.10$^{-3}$ | Egde Penetration (mm) | Adhesion (mN/15 mm) | Electrolyte Compatibility (Flocculation |
|---|---|---|---|---|
| 1a | 265 | 0.60 | 0.9 | — |
| 1b | 182 | 0.60 | 0.9 | — |
| 1c | 229 | 0.50 | 0.8 | — |
| 1d | 230 | 0.60 | 0.9 | — |
| 1e | 225 | 0.55 | 0.9 | — |
| 1f | 220 | 0.60 | 1.1 | — |
| 1g | 231 | 0.60 | 0.9 | — |
| 1h | 215 | 0.60 | 0.8 | — |
| 1i | 230 | 0.60 | 0.8 | — |
| 1j | 228 | 0.65 | 0.9 | — |
| 1k | 230 | 0.60 | 1.0 | — |
| 1l | 229 | 0.60 | 1.0 | — |
| 2a | 240 | 0.60 | 1.70 | — |
| 2b | 258 | 0.60 | 1.60 | — |
| 2c | 262 | 0.60 | 1.60 | — |
| 2d | 255 | 0.60 | 1.50 | — |
| 2e | 260 | 0.55 | 1.60 | — |
| 2f | 258 | 0.50 | 1.50 | — |
| 2g | 245 | 0.50 | 1.50 | — |
| 2h | 259 | 0.55 | 1.60 | — |
| 2i | 261 | 0.50 | 1.50 | — |
| 2j | 260 | 0.60 | 1.60 | — |
| 2k | 255 | 0.55 | 1.60 | — |
| 2l | 258 | 0.50 | 1.50 | — |
| 2m | 255 | 0.60 | 1.20 | — |

TABLE 7

Test Results (Comparative Examples C1-C2)

| Example | Internal Bond Strength (ft · lb.10$^{-3}$ | Egde Penetration (mm) | Adhesion (mN/15 mm) | Electrolyte Compatibility (Flocculation |
|---|---|---|---|---|
| C1a | 162 | 0.88 | 0.6 | — |
| C1b | 164 | 0.92 | 1.0 | — |
| C1c | 160 | 1.03 | 0.6 | — |
| C1d | 165 | 0.90 | 0.8 | — |
| C1e | 165 | 1.00 | 0.7 | — |
| C1f | 166 | 0.90 | 0.6 | — |
| C1g | 168 | 0.80 | 0.7 | — |
| C1h | 170 | 0.80 | 0.7 | — |
| C1i | 166 | 0.80 | 0.8 | — |
| C1j | 177 | 0.90 | 0.5 | — |
| C2a | 219 | 1.00 | 0.2 | + |
| C2b | 208 | 1.10 | 0.2 | + |
| C2c | 264 | 0.90 | 0.2 | + |
| C2d | 256 | 0.90 | 0.2 | + |
| C2e | 214 | 1.10 | 0.2 | + |
| C2f | 220 | 0.83 | 0.3 | + |
| C2g | 256 | 0.85 | 0.2 | + |
| C2h | 248 | 0.85 | 0.2 | + |
| C2i | 245 | 1.03 | 0.3 | + |
| C2j | 256 | 0.70 | 0.2 | + |
| C2k | 274 | 0.70 | 0.2 | + |
| C2l | 269 | 0.80 | 0.3 | + |
| C2m | 284 | 0.80 | 0.5 | + |
| C2n | 273 | 0.80 | 0.5 | + |
| C2o | 267 | 0.90 | 0.5 | + |
| C2p | 287 | 0.80 | 0.7 | + |
| C2q | 295 | 0.80 | 0.4 | + |
| C2r | 287 | 0.70 | 0.5 | + |

TABLE 7

| Example | Internal Bond Strength (ft · lb.$10^{-3}$) | Egde Penetration (mm) | Adhesion (mN/15 mm) | Flocculation |
|---|---|---|---|---|
| Test Results (Comparative Examples C1–C2) | | | | |
| C3a | 220 | 0.60 | 1.9 | – |
| C3b | 230 | 0.60 | 0.9 | – |
| C3c | 228 | 0.50 | 0.8 | – |
| C3d | 225 | 0.60 | 0.8 | – |
| C3e | 231 | 0.55 | 0.9 | – |
| C3f | 230 | 0.60 | 1.0 | – |
| C3g | 240 | 0.60 | 1.0 | – |
| C3h | 236 | 0.65 | 1.1 | – |
| C3i | 225 | 0.55 | 1.0 | – |
| C3j | 227 | 0.60 | 0.9 | – |
| C3k | 232 | 0.60 | 0.9 | – |
| C3l | 229 | 0.60 | 1.0 | – |

It will be understood that each of the elements described above, or two or more together, may also find a useful application in other types of paper production systems and processing procedures differing from the types described above.

While the invention has been illustrated and described as embodied in the context of a water-resistant photographic paper support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A water-resistant photographic paper support, comprising
   a sheet material base paper internally sized using one or more hydrophobizing sizing agents; and
   a first inner surface-coating on two sides of the sheet material including
   a polyacrylamide,
   a modified starch,
   a water-soluble inorganic salt which is a member selected from the group consisting of chlorides of an alkali metal, sulphates of an alkali metal, chlorides of an alkali earth metal, sulphates of an alkali earth metal and mixtures thereof;
   a second outer surface coating on two sides of the sheet material with polyolefin.

2. The water-resistant photographic paper support according to claim 1, wherein
   the polyacrylamide is a member selected from the group consisting of an anionic polyacrylamide, a cationic polyacrylamide, an amphoteric polyacrylamide and a mixture thereof.

3. The water-resistant photographic paper support according to claim 1, wherein
   the polyacrylamide is an anionic polyacrylamide and has an anionic group content of between 0 and 85 mole-%.

4. The water-resistant photographic paper support according to claim 1, wherein
   the modified starch is an oxidized starch.

5. The water-resistant photographic paper support according to claim 1, wherein
   the polyacrylamide and the modified starch are in a weight ratio to each other of between 1 to 3 and 3 to 1.

6. The water-resistant photographic paper support according to claim 1, wherein
   the coating mass is coated on the paper base to form a dry weight of between 1.5 and 6 g/m$^2$.

7. The water-resistant photographic paper support according to claim 1, wherein
   the soluble inorganic salt is a member selected from the group consisting of calcium chloride, magnesium chloride, sodium chloride, potassium chloride, sodium sulphate, potassium sulphate, and mixtures thereof.

8. The water-resistant photographic paper support according to claim 1, wherein
   the salt is sodium chloride.

9. The water-resistant photographic paper support according to claim 1, wherein
   the weight ratio of salt to polyacrylamide is between 2 to 3 and 2 to 1.

10. A water-resistant photographic paper support comprising
   a base paper internally sized with at least one hydrophobizing sizing agent, surface sized with an aqueous coating mixture, and coated with a polyolefin on both sides, wherein said aqueous coating mixture includes
   a polyacrylamide which is a member selected from the group consisting of an anionic polyacrylamide, a cationic polyacrylamide, an amphoteric polyacrylamide and a mixture thereof,
   an oxidized starch,
   a water-soluble inorganic salt which is a member selected from the group consisting of chlorides of an alkali metal, sulphates of an alkali metal, chlorides of an alkali earth metal, sulphates of an alkali earth metal and mixture thereof.

11. A water-resistant photographic paper support according to claim 10, wherein
   the polyacrylamide is an anionic polyacrylamide and has an anionic group content of between 0 and 85 mole-%.

* * * * *